United States Patent [19]

Nishimura et al.

[11] 3,994,650

[45] Nov. 30, 1976

[54] APPARATUSES FOR CASTING PNEUMATIC TIRES

[75] Inventors: Kazuhiro Nishimura, Kodaira; Jumei Harada, Higashi-Murayama; Tetsuhiko Migita, Kodaira; Tsutomu Matsunaga, Higashi-Murayama, all of Japan

[73] Assignee: Bridgestone Tire Company Limited, Tokyo, Japan

[22] Filed: Apr. 15, 1975

[21] Appl. No.: 568,350

[30] Foreign Application Priority Data

Apr. 22, 1974 Japan .............................. 49-45212

[52] U.S. Cl. .............................. 425/242 R; 425/55; 249/184
[51] Int. Cl.² .................. B29C 5/00; B29F 1/00; B29H 17/00
[58] Field of Search ............... 425/242 R, 54, 55, 57

[56] References Cited
UNITED STATES PATENTS

| | | | |
|---|---|---|---|
| 1,140,499 | 5/1915 | Chalfant et al. | 425/55 |
| 1,194,968 | 8/1916 | De Mattia | 425/57 |
| 3,123,122 | 3/1964 | Beckadolph | 152/330 |
| 3,459,849 | 8/1969 | De Ronde | 425/330 |
| 3,645,655 | 2/1972 | Beneze | 425/35 |

FOREIGN PATENTS OR APPLICATIONS 4,530,590  4/1966  Japan .............................. 425/129

Primary Examiner—J. Howard Flint, Jr.
Attorney, Agent, or Firm—Sughrue, Rothwell, Mion, Zinn and Macpeak

[57] ABSTRACT

A method of and apparatus for casting pneumatic tires by pouring a fluidized tire-forming material into a molding cavity defined between the outer peripheral surface of a separable hard core of a mold assembly and the inner peripheral surface of an outer separable hard mold member of the mold assembly. The separable hard core is composed of at least three segments and toroidal in shape. At least one segment of the separable core guidingly is retracted in a radial direction and then moved in a direction which does not hinder retractive movement of the remaining segments and subsequently these remaining segments are retracted in the radial direction, whereby the cast tire can easily be removed from the mold assembly.

3 Claims, 9 Drawing Figures

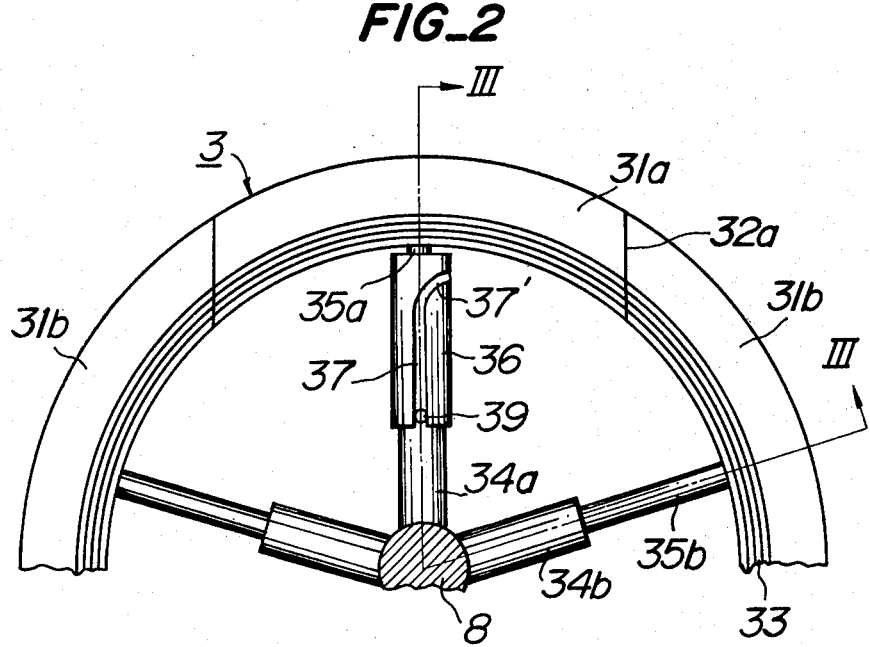
FIG_2
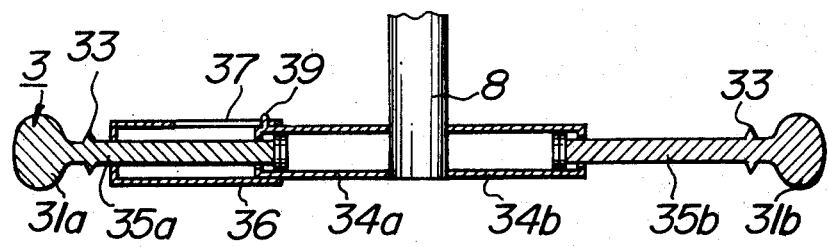
FIG_3

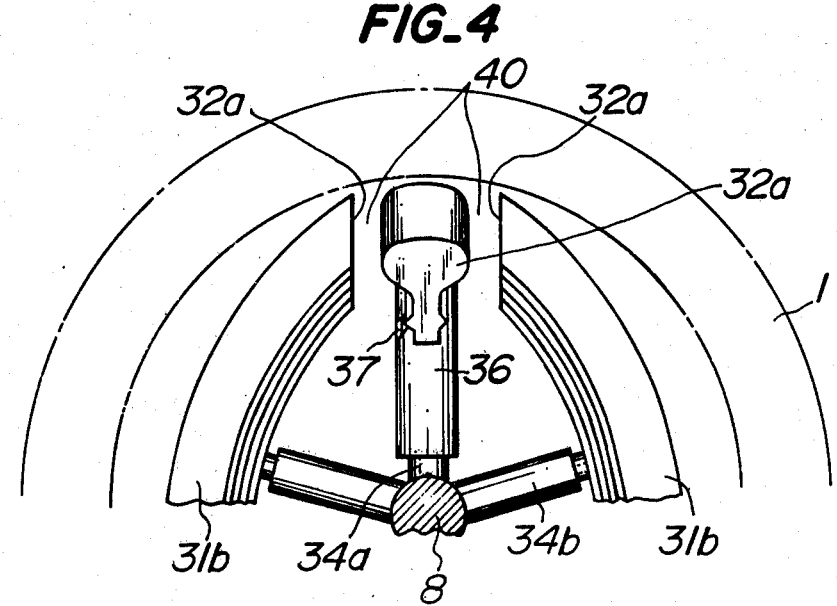
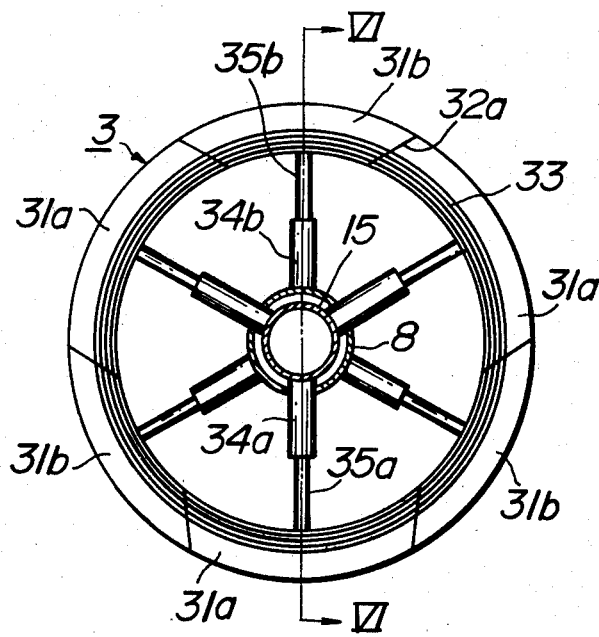

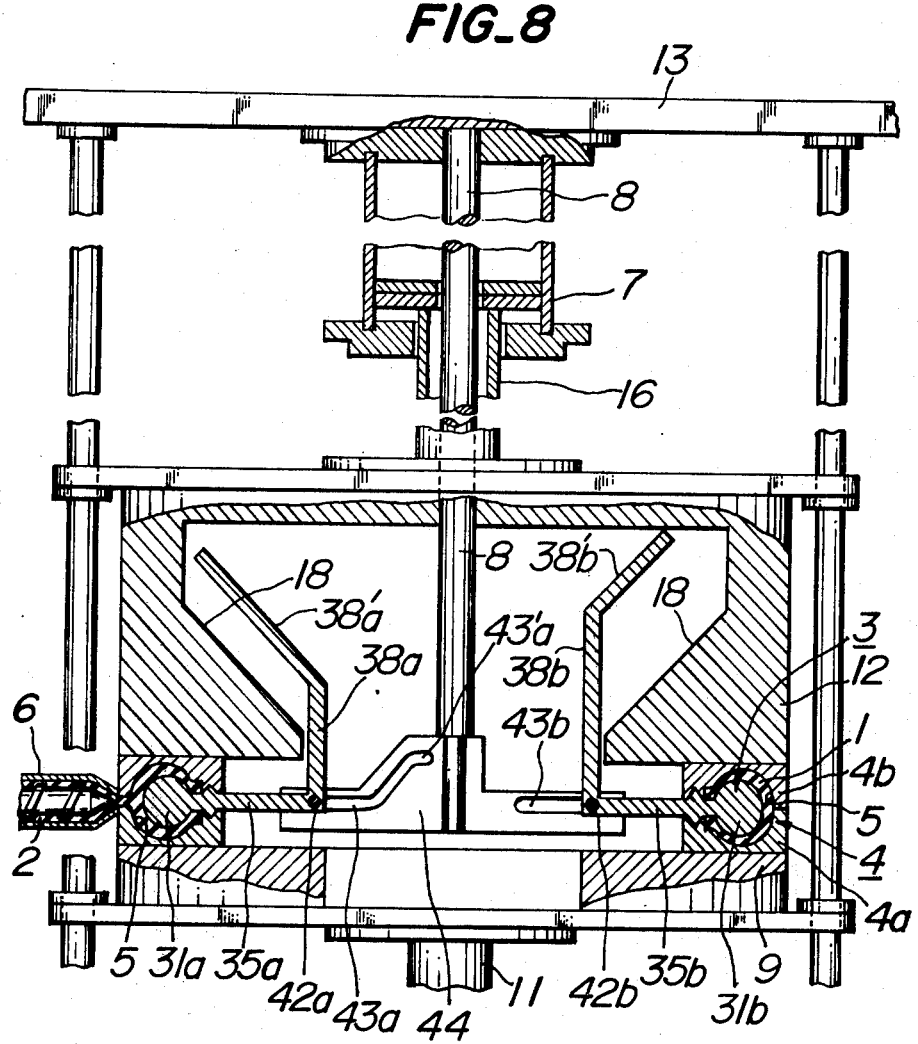

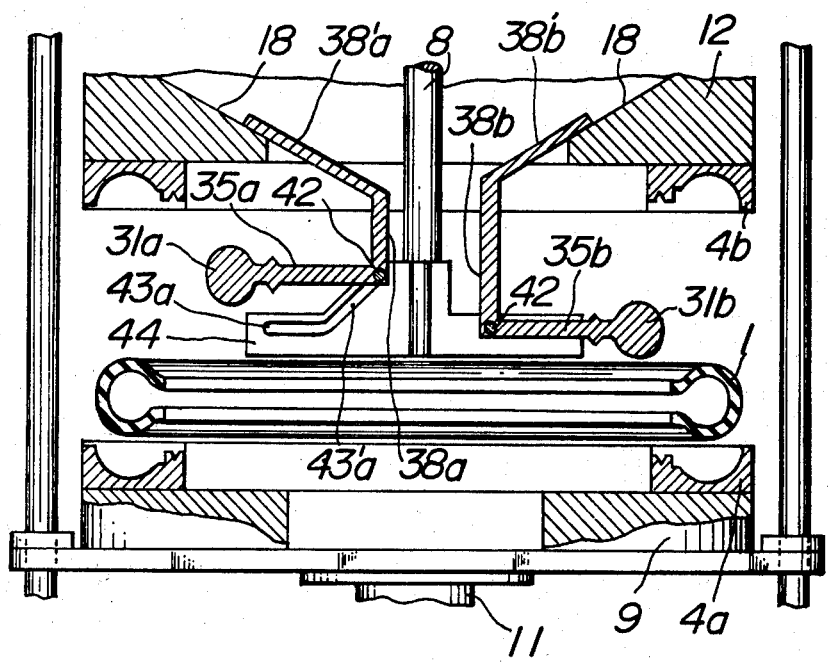

APPARATUSES FOR CASTING PNEUMATIC TIRES

This invention relates to apparatus for casting pneumatic tires apparatus for use in and more particularly to apparatus for use in a method of casting pneumatic tires by pouring a thermoplastic or thermosetting fluidized tire-forming material into the cavity of a mold, and solidifying the material thus poured.

The pneumatic tire is toroidal in shape and may be not only filled with air, foam and elastomer, but also may be made of a highly elastic material without filled with air, foam and elastomer.

Heretofore, various kinds of apparatus for casting pneumatic tires by injection molding have been proposed. Particularly, an apparatus for defining the inner peripheral surface of a pneumatic tire to be cast has been noticed. However, an apparatus which makes use of a continuous toroidal metal core has the disadvantage that the cast tire is forced to be considerably deformed when it is removed from the mold assembly, and as a result, a permanent strain is remained in the tire, and that it is impossible to cast a tire comprising bead wires embedded in bead parts, a tire made of a high molecular material having relatively high elasticity and the like.

An apparatus which makes use of a toroidal metal core composed of separable segments is capable of easily removing the cast tire from the metal core, but has the disadvantage that the core segments must be assembled and disassembled every time the tire is cast thus requiring troublesome operation for a long time, and as a result, a continuous casting could not be effected and hence provides a material decrease in yield.

A conventional method of using a flexible core to which is applied a bladder which is used for the vulcanizing step of a tire comprising cords could not make use of a highly viscous material since the core is flexible and hence the tire becomes deformed when a fluidized high molecular material is poured under a high pressure. In addition, a method which makes use of separable cores for casting a carcass band and a tread band and in which the cast tire is removed from the separable cores by superimposing and contracting them in succession has the disadvantage that in the case of applying this method to cast a pneumatic tire by injection molding the use of the cores which are large in section prevents the core from being sufficiently contracted.

Therefore, an object of the present invention is to provide an apparatus for use in a method of casting penumatic tires which can obviate the aforesaid difficulties of the conventional methods of casting tires, which can make use of various kinds of fluidized tire-forming materials such as fluidized high molecular materials which are highly elastic and viscuous, which can automatically remove the cast tire from the mold assembly in an easy manner, and which can effect a continuous injection molding.

A feature of the invention is the provision of an apparatus for use in a method of casting pneumatic tires by pouring a fluidized tire-forming material into a molding cavity defined between the outer peripheral surface of a separable hard core of a mold assembly and the inner peripheral surface of an outer separable hard mold member of said mold assembly, said outer peripheral surface of said separable core defining the inner peripheral surface of a pneumatic tire to be cast and said inner peripheral surface of said outer separable mold member defining the outer peripheral surface of the pneumatic tire to be cast, characterized by comprising the steps of coaxially aligning said separable core within said outer separable mold member to define said molding cavity therebetween, said core being composed of at least three segments circumferentially arranged and adjoining with each other through a junction surface to make said core toroidal in shape, said junction surface permitting said segments to be alternately retracted in a radial direction in succession, and each of said segments being provided at its inner peripheral upper and lower edges with portions engageable with said separable mold members, pouring a fluidized tire-forming material into said molding cavity under pressure, solidifying the material thus poured, separating said outer separable mold member from said tire and said toroidal core, retracting at least one segment of said separable toroidal core in the radial direction while at the same time moving in a direction which does not hinder the retractive movement of the remaining segments, retracting said remaining segments in the radial direction, and removing the cast tire from said mold assembly.

The fluidized tire-forming material such as a fluidized high molecular material is a thermoplastic or thermosetting resin, for instance, a suitable polymer based on polyurethane. Use may also be made of a fluidized high molecular material having various degrees of viscosity and elasticity on the order of 50 to 600 Kg/cm$_2$.

Examples of such material are copolymer of ethylene with ethyl acrylate, vinyl acetate or $\alpha$-olefin; polyethylene mixed with natural rubber or with synthetic rubber; polypropylene; and ethylene-propylene copolymer.

The apparatus for casting pneumatic tires by injection molding according to the invention comprises a mold assembly composed of a separable solid core whose outer peripheral surface conforms with the inner peripheral surface of a tire to be cast and an outer separable solid mold member whose inner peripheral surface conforms with the outer peripheral surface of the tire to be cast. The separable core and the separable mold member are made of a hard material such as metals, for example, a structural steel in general and the like.

The separable core is composed of at least three segments circumferentially arranged and adjoining with each other through a junction surface to make said core toroidal in shape, the junction surface permitting the segments to be alternately moved in the radial direction in succession. Each segment is provided at its inner peripheral upper and lower edges with portions engageable with the mold member. After the tire has been cast, at least one segment is retracted in the radial direction and then is moved in a direction which is different from the retractive direction and which does not hinder the retractive movement of the remaining segments. Then, the remaining segments are retracted in the radial direction and the cast tire is removed from the mold assembly.

The core segments may be retracted in the radial direction with the aid of means such as a piston slidably fitted in a cylinder and the like. The invention is capable of automatically assembling and disassembling the segments within a short time and of continuously casting pneumatic tires and hence provides a material increase in yield.

The invention will now be described in greater detail with reference to the accompanying drawings, wherein:

FIG. 2 is a partial plan view showing a separable core composed of at least three segments and used for the apparatus shown in FIG. 1;

FIG. 3 is a section on line III—III of FIG. 2;

FIG. 4 is a partial plan view showing the retracted condition of the segments taken when a cast tire is to be removed from the mold assembly;

FIG. 5 is a plan view of another embodiment of the separable core;

FIG. 8 is a front elevation of a further embodiment of the apparatus of the invention for carrying out the method showing the essential parts partly in section; and FIG. 9 shows the same section as FIG. 8 in the tire removable condition.

Figure 1:
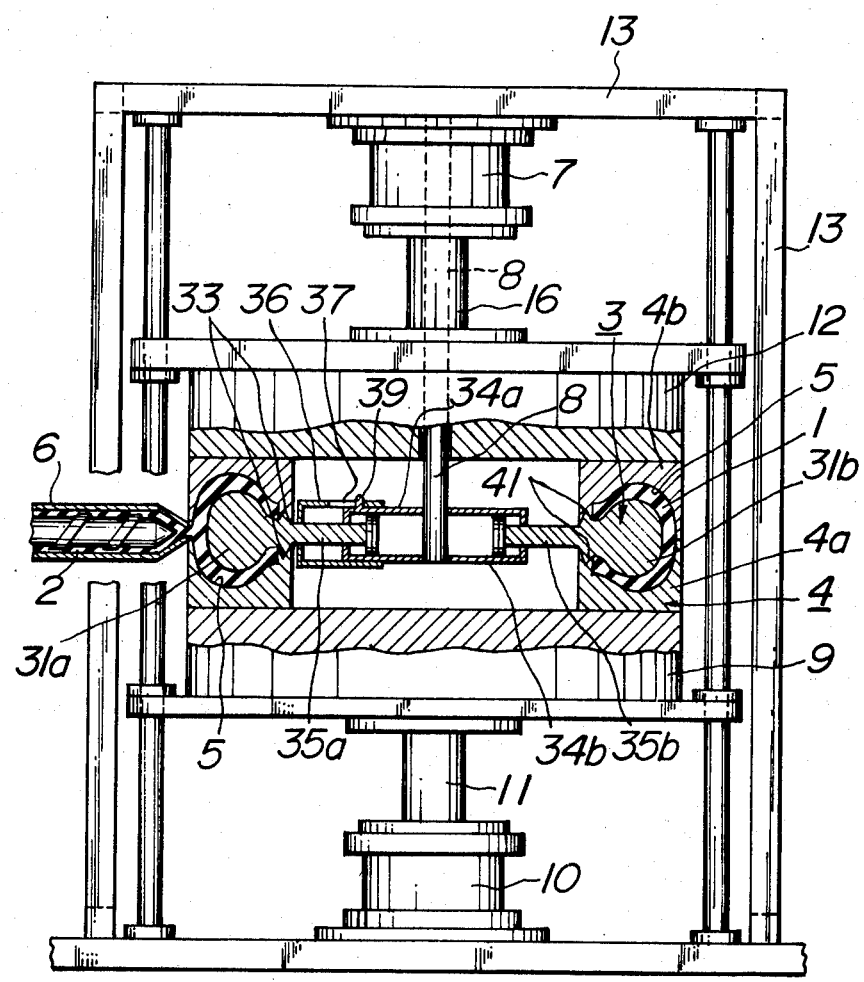
FIG. 1 is a front elevation of one embodiment of the apparatus of the invention for carrying out the method showing its essential parts partly in section.

In FIG. 1 is shown one embodiment of the apparatus according to the invention. In the present embodiment, a mold assembly comprises a separable core 3 and a separable mold member 4 coaxially aligned with each other and defining a molding cavity 5 therebetween. The cavity 5 is toroidal and has a contour which conforms with that of a pneumatic tire 1 to be cast. A fluidized tire-forming material 2 is poured under pressure into the molding cavity 5 with the aid of an injector 6.

In FIG. 2 is shown a part of the separable core 3 composed of at least three core segments 31a, 31b separably joined together into one toroidal body. In the present embodiment, the separable core 3 is composed of six core segments, 31a, 31a, 31a; 31b, 31b, 31b. Each core segment 31a, 31b is made integral with a piston rod 35a, 35b slidably fitted in a corresponding cylinder 34a, 34b radially projecting from a supporting rod 8 secured to the top of a supporting frame 13 of the mold assembly and extending downwardly therefrom.

The segments 31a, 31a, 31a; 31b, 31b, 31b are slidably engaged with each other at junction surface 32a such that the alternate segments 31a, 31a, 31a can be moved at the first time in a radial direction along the junction surface 32a.

In FIG. 3 is shown a section of the separable core 3 taken on line III—III of FIG. 2. As shown in FIG. 3, each segments 31a; 31b has an outer surface which defines the inner peripheral surface of a pneumatic tire to be cast and provided at its inner peripheral upper and lower edges with annular ridges 33 adapted to be engaged with opposed grooves 41 formed in the separable mold member 4.

In the present embodiment, three piston rods 35a, 35a, 35a are made integral with the core segments 31a, 31a, 31a and slidably fitted in cylinders 34a, 34a, 34a secured to the supporting rod 8. The remaining three piston rods 35b, 35b, 35b are made integral with the core segments 31b, 31b, 31b and slidably fitted in cylinders 34b, 34b, 34b secured to the supporting rod 8.

Each cylinder 34a is provided at its outer end with a pin 39 slidably engaged with a groove 37 formed in a sleeve 36 which is secured to the piston rod 35a and slidably fitted around the cylinder 34a. The groove 37 runs in the radial direction and is provided with a bent portion 37' inclined in a direction crossing the plane of the tire.

The method of casting a pneumatic tire will now be described with reference to the embodiment shown in FIGS. 1 to 4.

In the first place, the separable core 3 is coaxially aligned with the separable mold member 4 with the ridges 33 engaged with the corresponding grooves 41. Then, the fluidized tire-forming material 2 is introduced under pressure into the molding cavity 5 defined between the separable core 3 and the separable mold member 4. When the fluidized tire-forming material becomes hardened, the lower separable part 4a secured to the lower press 9 is downwardly moved by pulling the piston rod 11 into the cylinder 10, while the upper separable part 4b secured to the upper press 12 is upwardly moved by pulling the piston rod 16 into the cylinder 7. As a result, the upper and lower separable parts 4b, 4a of the outer mold member 4 are separated from the inner core 3 to open the outer mold member 4.

Then, the three segments 31a, 31a, 31a which are movable in the first time are retracted in the radial direction by pulling the piston rod 35a into the cylinder 34a. As a result, the guide groove 37 slidably engaged with the pin 39 causes the segment 31a to retract in the radial direction at the first time and then to move in a direction crossing the plane of the tire 1.

That is, the segment 31a is retracted in the radial direction to pull it out of the cast tire 1 and then moved in the direction crossing the tire plane to form air gaps 40 between the segment 31a and opposed junction surfaces 32a, 32a. These air gaps 40 permit the remaining three segments 31b, 31b, 31b to be retracted in the radial direction by pulling the piston rods 35b, 35b, 35b into the respective cylinders 34b, 34b, 34b, thereby separating these segments 31b, 31b, 31b from the tire 1.

In FIG. 4 are shown one of the three segments 31a and two of the three segments 31b, 31b which have been separated from the tire 1. As seen from FIG. 4, the cast tire 1 can be removed from the mold assembly thus retracted therefrom.

Figure 6:
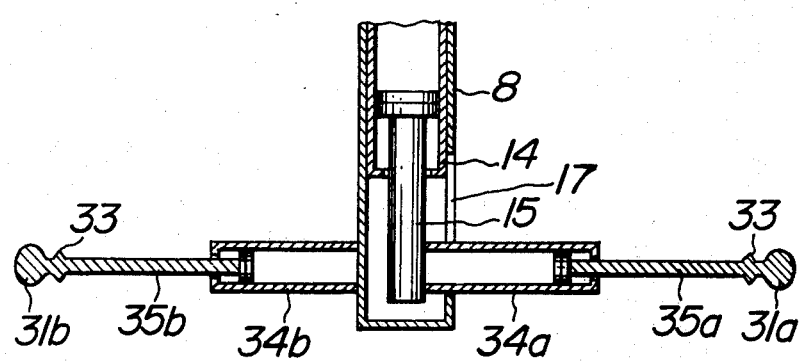
FIG. 6 is a section on line VI—VI of FIG. 5.
Figure 7:
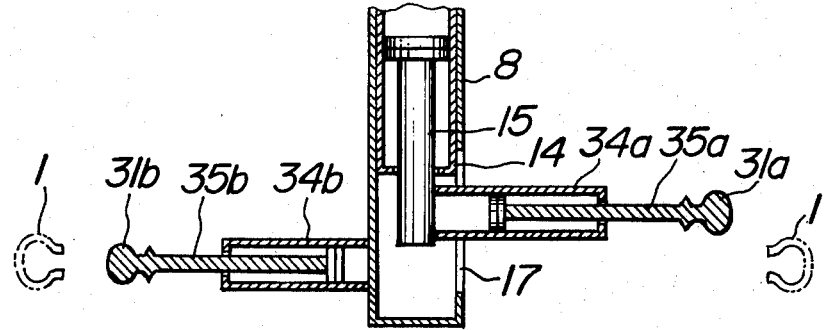
FIG. 7 shows the same section as FIG. 6 in the tire removable condition.

In FIGS. 5 to 7 is shown a second embodiment of the mold assembly wherein each segment 31a of the separable core 3 is different in operation from that shown in FIGS. 1 to 4.

In the present embodiment, the separable core 3 is composed of six segments 31a, 31b, 31a, 31b, 31a, 31b adjoined together at the junction surface 32a to make the core 3 toroidal in shape.

In the present embodiment, the supporting rod 8 shown in FIGS. 1 to 4 is made hollow. The hollow supporting rod 8 is provided at its upper inside portion with a cylinder 14 in which is slidably fitted a piston rod 15 and at its lower portion with vertical grooves 17 which are engaged with the cylinders 34a, 34a, 34a in which are slidably fitted the piston 35a, 35a, 35a made integral with the segments 31a, 31a, 31a, respectively. Alternately around the lower end of the hollow supporting rod 8 are secured the cylinders 34b, 34b, 34b in which are slidably fitted the piston rods 35b, 35b, 35b made integral with the segments 31b, 31b, 31b, respectively.

The method of casting a pneumatic tire will now be described with reference to the embodiment shown in FIGS. 5 to 7.

As in the previous embodiment shown in FIGS. 1 to 4, the separable core 3 of the mold assembly is coaxially aligned with the separable outer mold member 4 with the annular ridges 33 engaged with the corresponding annular grooves 41 to define the molding cavity 5 between the separable core 3 and the separable outer mold member 4. Then, the fluidized tire-forming material 2 is introduced into the molding cavity 5. When the fluidized tire-forming material 2 becomes hardened, the lower separable part 4a secured to the lower press 9 is downwardly moved by pulling the piston rod 11 into the cylinder 10 and the upper separable part 4b secured to the upper press 12 is upwardly moved by pulling the piston rod 16 into the cylinder 7. As a result, the upper and lower separable parts 4b, 4a of the separable outer mould member 4 are separated from the inner core 3 to open the separable mold member 4.

Then, those three segments 31a, 31a, 31a which are movable in the radial direction at the first time are moved in the radial direction by pulling the piston rods 35a, 35a, 35a into the radial cylinders 34a, 34a, 34a secured to the piston rod 15 to separate these segments 31a, 31a, 31a from the tire 1. Then, these segments 31a, 31a, 31a are moved in the direction perpendicular to the radial direction by pulling the piston rod 15 along the groove 17 into the cylinder 14 as shown in FIG. 7.

As above described, since the segments 31a, 31a, 31a are retracted in the radial direction at the first time and then moved vertically upwardly, there is formed an air gap which permits the remaining three segments 31b, 31b, 31b to retract in the radial direction. That is, after the movement of the segments 31a, 31a, 31a, the remaining three segments 31b, 31b, 31b can be retracted in the radial direction by pulling their piston rods 35b, 35b, 35b into the corresponding cylinders 34b, 34b, 34b, respectively, thereby separating the segments 31b, 31b, 31b from the cast tire 1. Thus, all the segments 31a, 31a, 31a; 31b, 31b, 31b are drawn out of the cast tire 1 shown by dotted lines in FIG. 7 so that it is possible to remove the cast tire 1 from the mold assembly.

In FIGS. 8 and 9 is shown a third embodiment of the mold assembly according to the invention wherein the separable segments 31a, 31a, 31a; 31b, 31b, 31b are made different in operation from those shown in FIGS. 5 to 7.

In FIG. 8 is shown the mold assembly according to the present embodiment in the condition that the fluidized tire-forming material 2 is poured under pressure into the molding cavity 5 with the aid of the injector 6.

In FIG. 9 are shown the separable segments 31a, 31a, 31a; 31b, 31b, 31b drawn from the cast tire 1. As seen from FIG. 9, the cast tire 1 can be removed from the mold assembly.

In the present embodiment, the inner ends of respective piston rods 35a, 35b are connected through pins 42a, 42b to short and long vertical guide plates 38a, 38b having upper bent portions 38a', 38b', respectively.

The pin 42a is slidably engaged with a horizontal groove 43a formed in a base plate 44 secured to the lower end of the supporting rod 8 whose upper end is secured to the top of the frame 13. The inner end of the horizontal guide groove 43a is communicated with an upwardly inclined groove 43a'. The pin 42b is slidably engaged with a horizontal groove 43b formed in the base plate 44. In the present embodiment, the upper press 12 is provided at its inner periphery with a tapered portion 18 extending in parallel with the upper bent portions 38a', 38' of the short and long vertical guide plates 38a, 38b.

In the case of casting a pneumatic tire with the aid of the mold assembly shown in FIGS. 8 and 9, the fluidized tire-forming material 2 is introduced under pressure into the cavity 5 as shown in FIG. 8. After the fluidized tire-forming material 2 has been hardened to cast the tire, the lower separable part 4a secured to the lower press 9 is separated from the cast tire 1 and the separable core 3 by pulling the piston rod 11 into the cylinder (not shown). Then, the upper press 12 is moved upwardly by pulling the piston rod 16 into the cylinder 7 provided for the upper press 12. As a result, the upper separable part 4b of the outer separable mold member 4 secured to the upper press 12 is separated from the cast tire 1 and the separable core 3.

If the upper press 12 is moved upwardly, its tapered portion 18 is brought into engagement with the upper bent portion 38a' of the short vertical guide plate 38a and then brought into engagement with the upper bent portion 38b' of the long vertical guide plate 38b. As the upper press 12 is moved upwardly, its tapered portion 18 causes the short vertical guide plate 38a and hence the segments 31a, 31a, 31a to retract in the radial direction as in the case described with reference to FIGS. 5 to 7, and then move upwardly along the upwardly inclined portion 43a' of the horizontal guide groove 43a.

If the upper press 12 is further moved upwardly, its tapered portion 18 is brought into engagement with the upper bent portion 38b' of the long vertical guide plate 38b and causes the segments 31b, 31b, 31b to retract in the radial direction along the horizontal guide groove 43b. As a result, all the segments 31a, 31a, 31a; 31b, 31b, 31b are drawn from the cast tire 1 and it is possible to remove the cast tire 1 from the mold assembly 3, 4.

In the above embodiments, alternate segments 31a, 31a, 31a are moved in different directions by two steps. Use may be made of a mechanism which can move alternate segments 31a, 31a, 31a in different directions by more than three steps. In addition, the up and down movements of the upper and lower presses 12, 9 and the movements of the alternate segments 31a, 31a, 31a may suitably be varied.

As stated hereinbefore, the invention is capable of using various kinds of fluidized tire-forming materials in dependence with characteristics required for pneumatic tires and of casting the same by injection molding process in a highly efficient and continuous manner.

What is claimed is:
1. In an apparatus for casting pneumatic tires by pouring a fluidized tire-forming material into a molding cavity, said cavity defined between the outer peripheral surface of a separable hard core of a mold assembly and the inner peripheral surface of an outer separable hard mold member of said mold assembly, the outer peripheral surface of said separable core defining the inner peripheral surface of a pneumatic tire to be cast and the inner peripheral surface of said outer separable mold member defining the outer peripheral surface of the pneumatic tire to be cast, the improvement comprising: a separable core composed of at least three segments circumferentially arranged and adjoining with each other through a junction surface to make said core toroidal in shape, said junction surface permitting alternate segments to be retracted in a radial direction in succession, and each segment being provided at its inner peripheral upper and lower edges with portions engageable with said mold member, a displacing mechanism for retracting all the segments in the radial direction when a tire is to be separated from the segments, and guide means disposed relative to at least one segment in the radial direction and cooperating with said displacing mechanism such that said one segment in its radially retracted condition is displaced into a plane defined by said segment which is different than a plane defined by the remaining segments.

2. An apparatus for casting pneumatic tires as claimed in claim 1, wherein said guide means is secured to at least one segment and said separable core is composed of at least one segment retractable in the radial direction and then displaceable in a direction crossing the plane of the tire in cooperation with said guide means and at least two segments retractable in the radial direction.

3. An apparatus for casting pneumatic tires as claimed in claim 1, wherein said guide means is secured to a segment supporting means and said separable core is composed of at least one segment retractable in the radial direction and then movable in a direction perpendicular to the radial direction in cooperation with said guide means and at least two segments retractable in the radial direction.

* * * * *